US011232785B2

(12) United States Patent
Seo et al.

(10) Patent No.: US 11,232,785 B2
(45) Date of Patent: Jan. 25, 2022

(54) SPEECH RECOGNITION OF NAMED ENTITIES WITH WORD EMBEDDINGS TO DISPLAY RELATIONSHIP INFORMATION

(71) Applicant: LG ELECTRONICS INC., Seoul (KR)

(72) Inventors: Jiwoo Seo, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 16/595,249

(22) Filed: Oct. 7, 2019

(65) Prior Publication Data
US 2020/0035228 A1 Jan. 30, 2020

(30) Foreign Application Priority Data
Aug. 5, 2019 (KR) .......................... 10-2019-0094876

(51) Int. Cl.
*G06F 40/295* (2020.01)
*G06F 40/30* (2020.01)
(Continued)

(52) U.S. Cl.
CPC ........ *G10L 15/1815* (2013.01); *G06F 40/284* (2020.01); *G06F 40/295* (2020.01); *G06F 40/30* (2020.01); *G10L 15/22* (2013.01)

(58) Field of Classification Search
CPC ......... G10L 15/01; G10L 15/16; G10L 15/18; G10L 15/1815; G10L 15/1822;
(Continued)

(56) References Cited

U.S. PATENT DOCUMENTS 9,454,957 B1 * 9/2016 Mathias ................ G10L 15/187
10,241,995 B2 * 3/2019 Rangarajan Sridhar ....................
G06F 40/30
(Continued)

FOREIGN PATENT DOCUMENTS

KR  20160027640  3/2016
KR  20180071931  6/2018
(Continued)

OTHER PUBLICATIONS

Korean Intellectual Property Office Application Serial No. 10-2019-0094876, Office Action dated Dec. 29, 2020, 106 pages.

*Primary Examiner* — Martin Lerner
(74) *Attorney, Agent, or Firm* — Lee Hong Degerman Kang & Waimey

(57) ABSTRACT

Disclosed are a method and an apparatus for speech recognition. In a method for processing speech recognition according to an embodiment of the disclosure, a relationship of a named entity is extracted and each named entity is clustered based on the extracted relationship of the named entity. An utterance intent is grasped by considering not only information about the named entity itself, but also relationship information of the clustered named entity tagged in the named entity, which may result in improvement of accuracy of speech recognition in the apparatus for speech recognition. A user equipment of the present disclosure can be associated with artificial intelligence modules, drones (unmanned aerial vehicles (UAVs)), robots, augmented reality (AR) devices, virtual reality (VR) devices, devices related to 5G service, etc.

10 Claims, 14 Drawing Sheets

(51) Int. Cl.
*G10L 15/18* (2013.01)
*G10L 15/22* (2006.01)
*G06F 40/284* (2020.01)

(58) Field of Classification Search
CPC ............. G10L 15/22; G10L 2015/0635; G10L 2015/0363; G10L 2015/225; G10L 2015/0633; G06F 40/205; G06F 40/211; G06F 40/279; G06F 40/295; G06F 40/30
USPC ....... 704/1, 9, 232, 236, 239, 244, 245, 257, 704/276
See application file for complete search history.

(56) References Cited

U.S. PATENT DOCUMENTS

| | | | |
|---|---|---|---|
| 10,242,320 B1* | 3/2019 | Elkholy | G06F 40/295 |
| 10,453,444 B2* | 10/2019 | Zitouni | G10L 15/063 |
| 2006/0080101 A1* | 4/2006 | Chotimongkol | G06F 40/295 |
| | | | 704/257 |
| 2009/0228264 A1* | 9/2009 | Williams | G10L 15/1822 |
| | | | 704/9 |
| 2015/0088511 A1* | 3/2015 | Bharadwaj | G10L 15/183 |
| | | | 704/244 |
| 2017/0161367 A1* | 6/2017 | Kemp | G10L 15/26 |
| 2018/0189265 A1* | 7/2018 | Chen | G06F 40/295 |
| 2019/0057310 A1* | 2/2019 | Olmstead | G06F 40/295 |
| 2019/0103092 A1* | 4/2019 | Rusak | G06F 40/35 |
| 2019/0279618 A1* | 9/2019 | Yadav | G10L 15/183 |
| 2019/0311036 A1* | 10/2019 | Shanmugam | G06F 40/30 |
| 2020/0027459 A1* | 1/2020 | Chae | G06F 40/295 |
| 2020/0043485 A1* | 2/2020 | Tonetti | G10L 15/22 |
| 2021/0026924 A1* | 1/2021 | Jones | G06F 40/295 |

FOREIGN PATENT DOCUMENTS

| | | |
|---|---|---|
| KR | 20190019661 | 2/2019 |
| KR | 1020190083629 | 7/2019 |

* cited by examiner

<prior art>

SPEECH RECOGNITION OF NAMED ENTITIES WITH WORD EMBEDDINGS TO DISPLAY RELATIONSHIP INFORMATION

CROSS-REFERENCE TO RELATED APPLICATION(S)

Pursuant to 35 U.S.C. § 119(a), this application claims the benefit of earlier filing date and right of priority to Korean Patent Application No. 10-2019-0094876, filed on Aug. 5, 2019, the contents of which are hereby incorporated by reference herein in its entirety.

BACKGROUND OF THE INVENTION

Field of the Invention

The present disclosure relates to a method and apparatus for speech recognition, more particularly, to a method and apparatus for speech recognition capable of improving a sentence intent analysis rate through named entity structuring.

Related Art

A device for speech recognition is a device performing speech recognition. The device for speech recognition may acquire a speech signal by recognizing received utterance of a user, and perform a predetermined operation based on a result of analyzing the speech signal.

With developments of a technology relating to speech recognition and a technology relating to home internet of things (IoT) (for example, a 5G communication technology), a plurality of IoT devices (devices for speech recognition) may recognize utterance of a user (start language), and a home IoT server (an apparatus for selecting a device for speech recognition) may receive a speech signal acquired by the recognition, analyze the speech signal and select/start a responding device (a device for speech recognition) to respond to the utterance of the user from among the plurality of IoT devices.

In using such a device for speech recognition, it is necessary to grasp an utterance intent of the user such that a responding device suitable for the utterance intent of the user is properly selected or the selected responding device performs a response corresponding to the utterance intent of the user. Furthermore, in constructing learning data including a named entity, named entity recognition (NER) is required.

However, when recognizing a named entity, the named entity does not include a representation of its category. Therefore, it is difficult to grasp a semantic relationship between named entities of a plurality of words contained in a text.

Due to the difficulty in determining the semantic relationship, it is likely that the device for speech recognition does not accurately select a responding device suitable for the utterance intent, or a target response is not performed.

SUMMARY OF THE INVENTION

The present disclosure has been made in consideration of the aforementioned needs and/or the problems.

An object of the present disclosure is to implement a method and apparatus for speech recognition for improving accuracy of determining a named entity and an utterance intent of a user through named entity structuring.

In addition, another object of the present disclosure is to implement a method and an apparatus for speech recognition for easily determining an utterance intent through named entity structuring without collecting similar named entities.

Furthermore, still another object of the present disclosure is to implement a method and an apparatus for speech recognition for easily determining an utterance intent by a user even in a case of a higher utterance pattern.

According to an embodiment of the present disclosure, there is provided a method for processing speech of an apparatus for speech recognition. The method includes: recognizing speech uttered by a user; extracting the speech uttered by the user to convert the speech into a text; recognizing a named entity based on the text; structuring a relationship of the named entity based on a word embedding method; displaying relationship information of the structured named entity; and determining a meaning of the named entity in consideration of the relationship information.

In addition, the word embedding method may use at least one of Word2vec, AdaGram, FasText, or Doc2vec.

In addition, the structuring of the relationship of the named entity based on the word embedding method may include: performing tokenization by separating the text into sentences as units and then identifying each word in the sentence; and performing embedding by representing the identified word by a vector and vectorizing the word through part-of-speech tagging and a named entity class.

In addition, in the structuring of the relationship of the named entity based on the word embedding method, a similarity between features may be measured through weight calculation between the features according to an unsupervised learning method, and the named entity with a high similarity for a threshold may be clustered.

In addition, the method may further include: determining an utterance intent based on the text corresponding to the speech of the user; and providing response information corresponding to a determination result of the utterance intent.

In addition, the determining of the utterance intent may include: recognizing the named entity; and recognizing the relationship information of the structured named entity.

In addition, the determining of the utterance intent may be performed, the method may further include restructuring the relationship of the named entity to reset the relationship information, when accuracy of the utterance intent is small compared to a preset target value, and a threshold in the restructuring of the relationship of the named entity may be smaller than a threshold in the structuring of the relationship of the named entity previously performed.

In addition, the method may further include displaying a response corresponding to the utterance intent together with accuracy of the utterance intent.

In addition, the method may further include updating the response information based on an additional text uttered after the text has been input, when one or more of the texts are input while the response information is being provided.

In addition, when a plurality of intents is determined as the result of the determining of the utterance intent, the response information corresponding to the utterance intent with a high reliability may be provided among the plurality of intents.

According to another embodiment of the present disclosure, there is provided an apparatus for speech recognition, the apparatus includes: a sensing unit; a memory; and a processor. The sensing unit recognizes speech uttered by a user, and the processor is configured to: extract the speech uttered by the user to convert the speech into a text;

recognize a named entity based on the text; structure a relationship of the named entity based on a word embedding method; display relationship information of the structured named entity; and grasp a meaning of the named entity in consideration of the relationship information.

Further scope of applicability of the present disclosure will be apparent from the detailed description described below. However, various modifications and changes within the spirit and scope of the present disclosure can be clearly understood by those skilled in the art, and therefore, the detailed description and specific embodiments such as preferred embodiments of the present disclosure should be understood to be given by way of example only.

The accompanying drawings, included as part of the detailed description in order to help understanding of the present disclosure, provide embodiments of the present disclosure and describe the technical characteristics of the present disclosure along with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
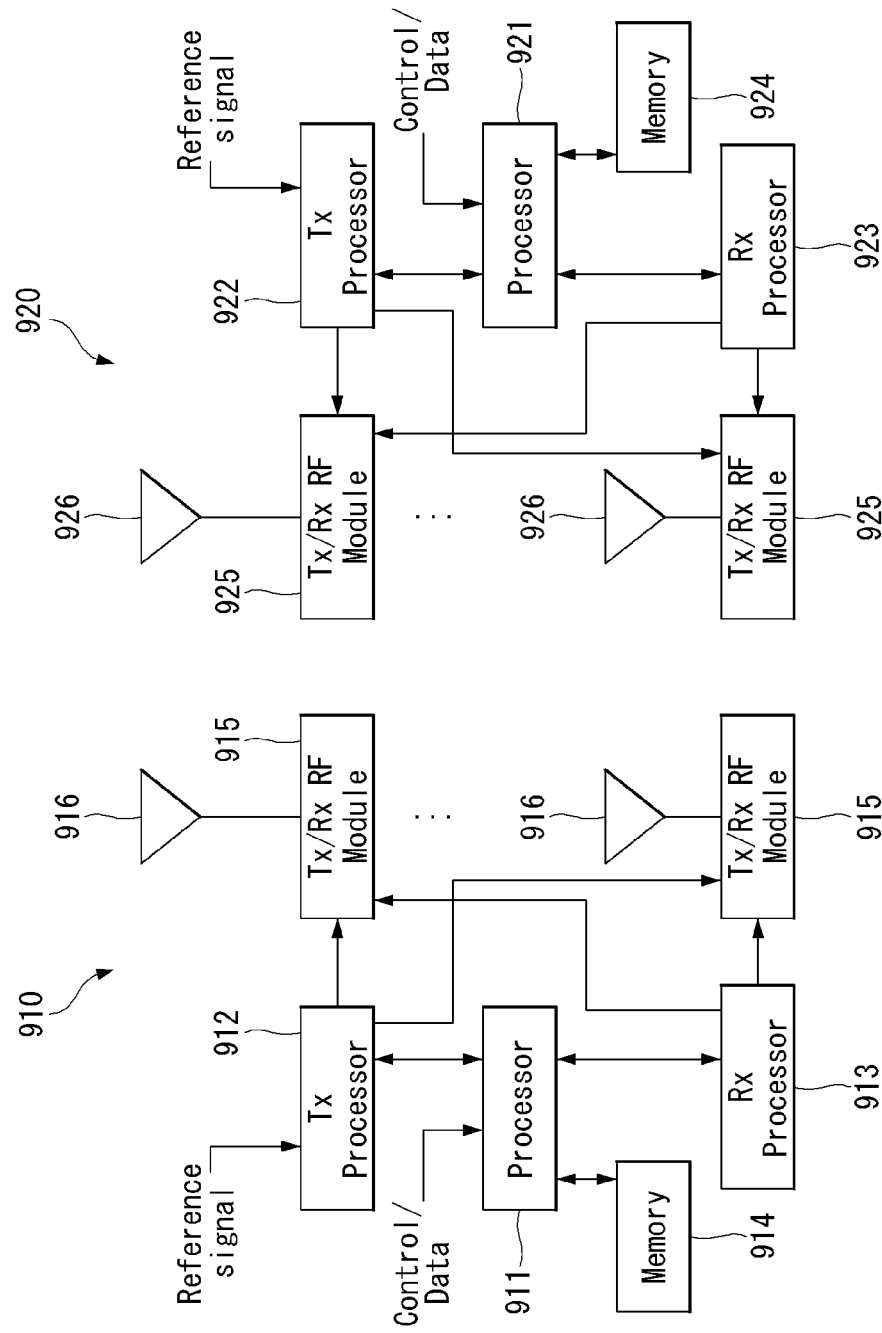
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), AI (Artificial Intelligence) module, a robot, an AR (Augmented Reality) device, a VR (Virtual Reality) device, an MR (Mixed Reality) device, a hologram device, a public safety device, a Main Test Component (MTC) device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnosis, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in down link (DL) (communication from the first communication device to the second communication device). The Rx processor implements various signal processing functions of L1 (i.e., physical layer).

Up link (UL) (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
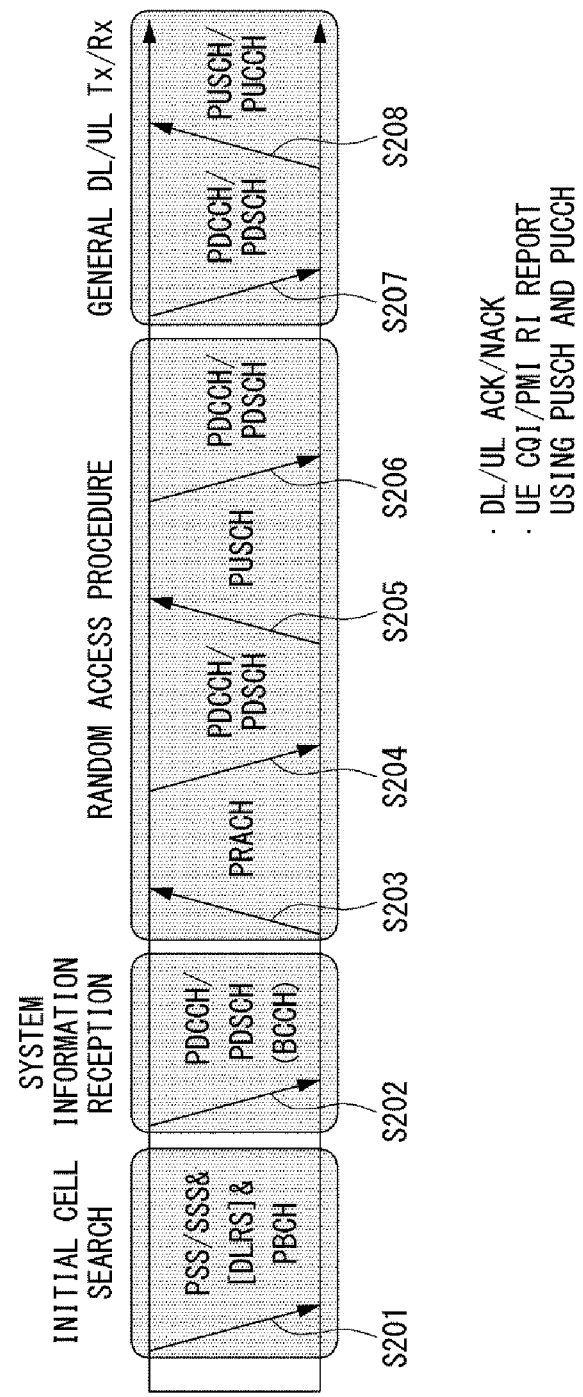
FIG. 2 shows an example of a signal transmission/reception method in a wireless communication system.

FIG. 2 is a diagram showing an example of a signal transmission/reception method in a wireless communication system.

Referring to FIG. 2, when a user equipment (UE) is powered on or enters a new cell, the UE performs an initial cell search operation such as synchronization with a base station (BS) (S201). For this operation, the UE can receive a primary synchronization channel (P-SCH) and a secondary synchronization channel (S-SCH) from the BS to synchronize with the BS and acquire information such as a cell ID. In LTE and 5G new radio (NR) systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three orthogonal frequency dependent multiplexing (OFDM) symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of data center interconnect (DCI) in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The single-sideband modulation (SSB) includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having two different lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include a Radio Resource Control (RRC) connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.
Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set.

Here, an SSB resource set can be set as {SSBx1, SSBx2, SSBx3, SSBx4, ... }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives a Near Zero Power (NZP) CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., continuity recheck incoming (CRI)) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., Enhanced mobile broadband (eMBB)) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with Interruption Radio Network Temporary Identifier (INT RNTI) provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in Pseudo-Random Binary Sequence (PRBs) and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
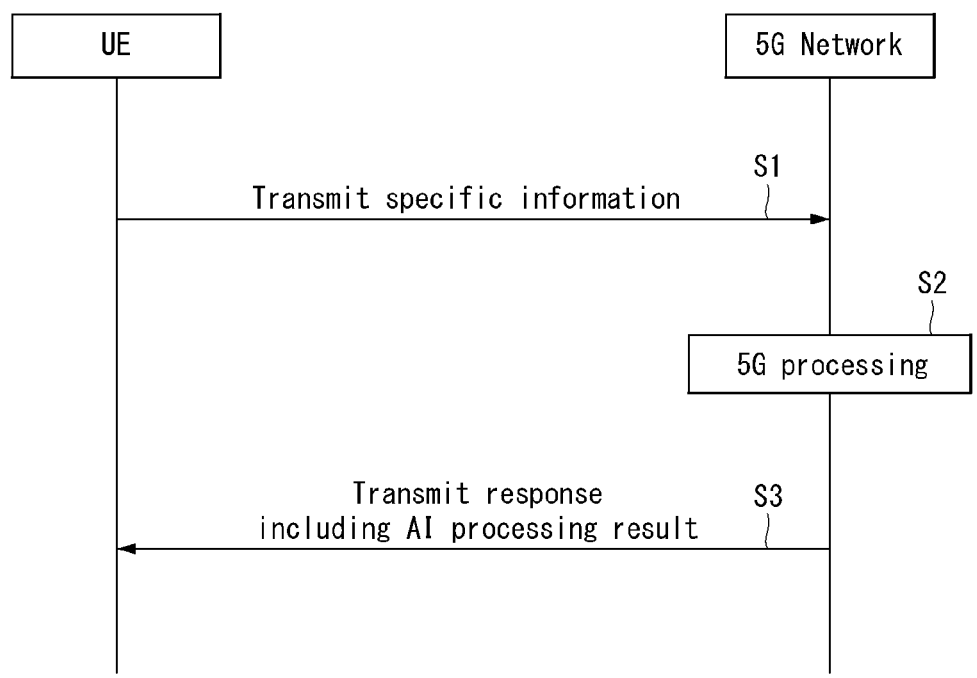
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

AI Device Block

Figure 4:
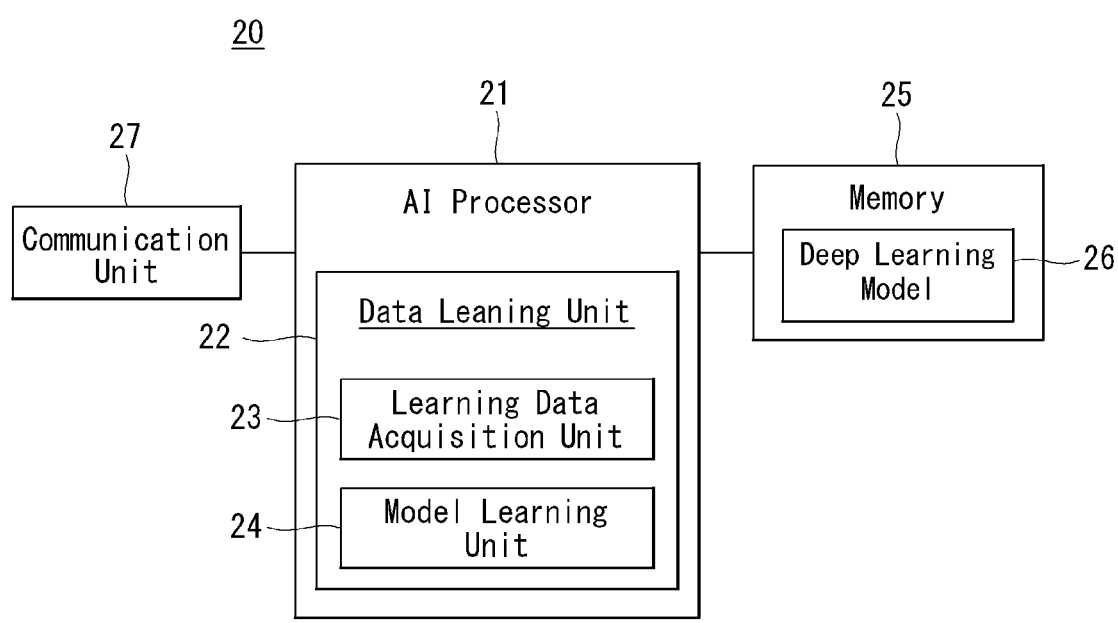
FIG. 4 is a block diagram of an AI device according to an embodiment of the present disclosure.

FIG. 4 is a block diagram of an AI device according to an embodiment of the present disclosure.

An AI device 20 may include an electronic device including an AI module that can perform AI processing, a server including the AI module, or the like. Further, the AI device 20 may be included as at least one component of the vehicle to perform together at least a portion of the AI processing.

The AI processing may include all operations related to driving of the vehicle. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wired or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 4 was functionally separately described into the AI processor 21, the memory 25, the communication unit 27, etc., but it should be noted that the aforementioned components may be integrated in one module and referred to as an AI module.

Figure 5:
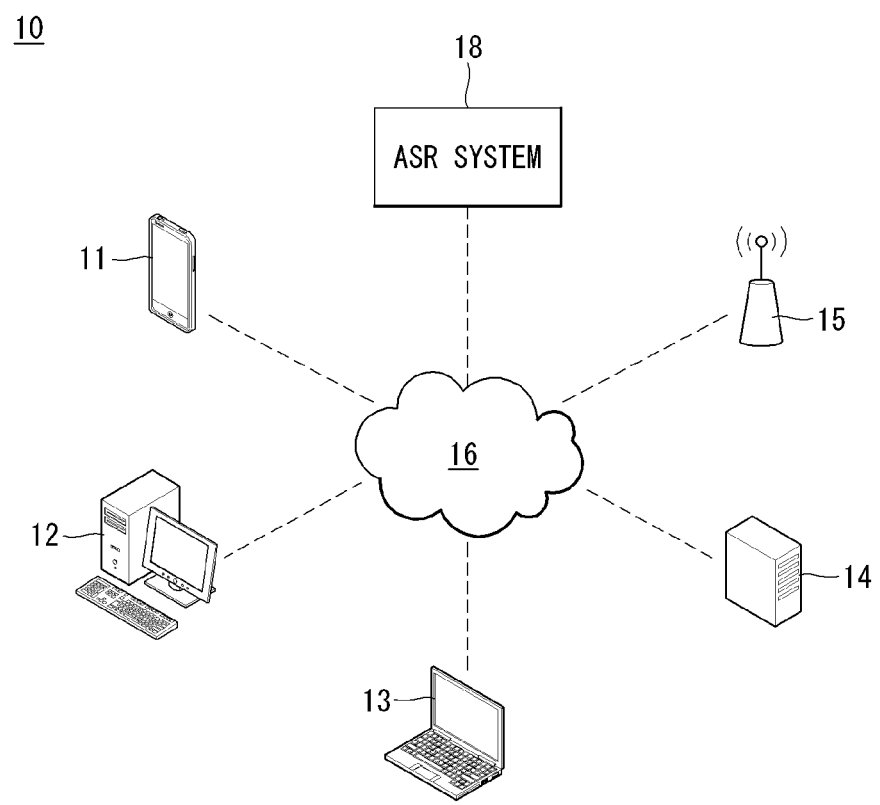
FIG. 5 is a block diagram of a communication system according to a preferred embodiment of the present disclosure.

FIG. 5 illustrates a block diagram of a schematic system in which a speech processing method is implemented according to an embodiment of the present disclosure.

Referring to FIG. 5, a system for implementing a speech processing method according to an embodiment of the present disclosure may include a text-to-to-speech device as a speech processing apparatus 10, a network system 16, and a speech processing engine. Speech system 18 may be included.

The at least one speech processing apparatus 10 may include a mobile phone 11, a PC 12, a notebook computer 13, and other server devices 14. The PC 12 and notebook computer 13 may be connected to at least one network system 16 via a wireless access point 15. According to an embodiment of the present disclosure, the speech processing apparatus 10 may include an audio book and a smart speaker.

Meanwhile, the ASR system 18 may be implemented in a server included in a network, or may be implemented by on-device processing and embedded in the speech processing apparatus 10. In the exemplary embodiment of the present disclosure, the ASR system 18 will be described on the premise that the ASR system 18 is implemented in the speech processing apparatus 10.

Figure 6:
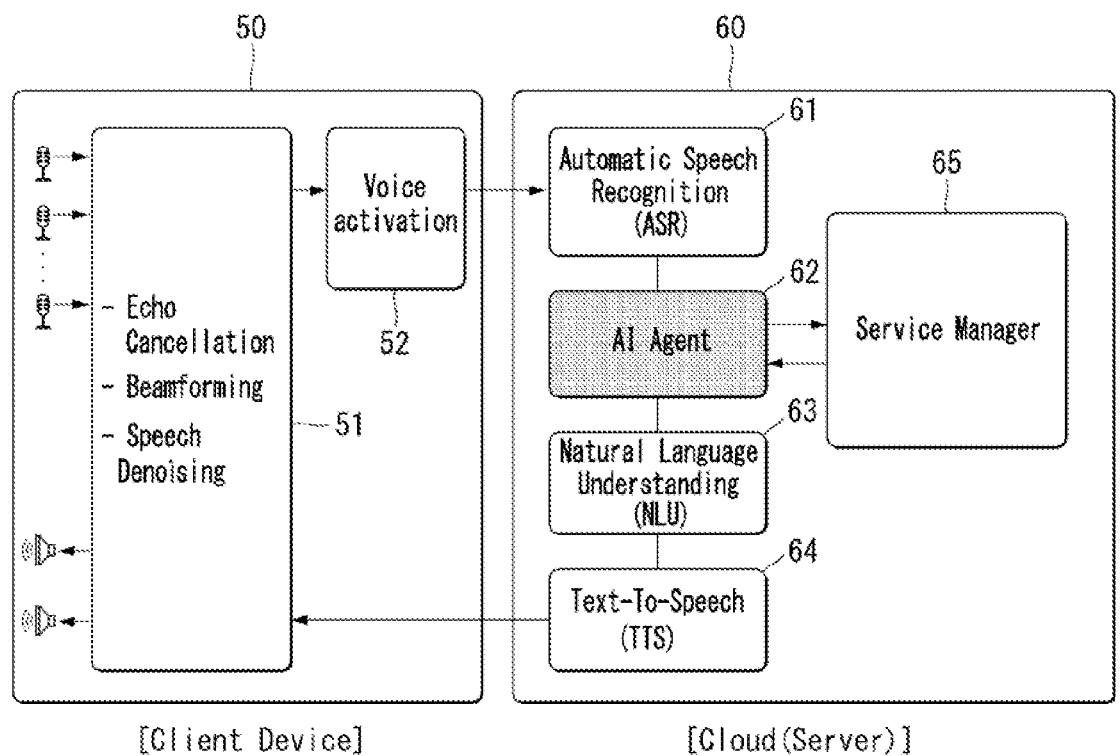
FIGS. 6 and 7 are a voice processing process performed in a device environment and/or a cloud environment or a server environment.

Hereinafter, a speech processing procedure performed by a device environment and/or a cloud environment or server environment will be described with reference to FIGS. 6 and 7. FIG. 6 shows an example in which, while a speech can be received in a device 50, a procedure of processing the received speech and thereby synthesize the speech, that is, overall operations of speech synthesis, is performed in a cloud environment 60. On the contrary, FIG. 7 shows an example of on-device processing indicating that a device 70 performs the aforementioned overall operations of speech synthesis by processing a received speech and thereby synthesizing the speech.

Figure 7:
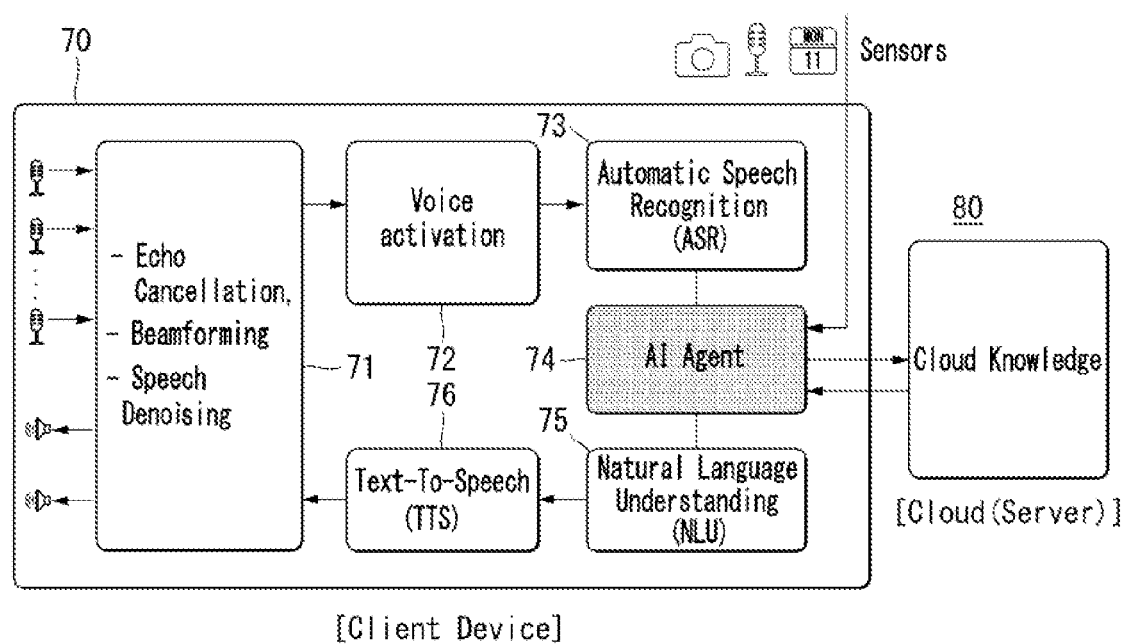

In FIGS. 6 and 7, the device environments 70 may be referred to as client devices, and the cloud environments 60 and 80 may be referred to as servers.

FIG. 6 shows a schematic block diagram of a text-to-speech (TTS) device in a TTS system according to an embodiment of the present disclosure.

In order to process a speech event in an end-to-end speech UI environment, various configurations are required. A sequence for processing the speech event performs signal acquisition playback, speech pre-processing, voice activation, speech recognition, natural language processing, and speech synthesis by which a device responds to a user.

The client device 50 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

According to an embodiment, the input module may include at least one microphone capable of receiving a user's utterance as a speech signal. The input module may include a speech input system and receive a user's speech as a speech signal through the speech input system. By generating an input signal for an audio input, the at least one microphone may determine a digital input signal for a user's speech. According to an embodiment, multiple microphones may be implemented as an array. The array may be arranged in a geometric pattern, for example, a linear geometric shape, a circular geometric shape, or a different random shape. For example, the array may be in a pattern in which four sensors are placed at 90 degrees to receive sound from four directions. In some embodiments, the microphone may include sensors of different arrays in a space of data communication, and may include a networked array of the sensors. The microphone may include an omnidirectional microphone and a directional microphone (e.g., a shotgun microphone).

The client device 50 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are essential to process a user speech, is generally performed in Cloud due to computing, storage, power limitations, and the like. The Cloud may include the cloud device 60 that processes a user input transmitted from a client. The cloud device 60 may exist as a server.

The cloud device 60 may include an auto speech recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front-end performs a Fourier transform on the speech input to extract spectral features that characterize the speech input as a sequence of representative multi-dimensional vectors. In addition, The ASR module 61 may include one or more speech recognition modules (e.g., an acoustic model and/or a language module) and may realize one or more speech recognition engines. Examples of the speech recognition model include Hidden Markov Models, Gaussian-Mixture Models, Deep Neural Network Models, n-gram language models, and other statistical models. Examples of the speech recognition model include a dynamic time warping (DTW)-based engine and a weighted finite state transducer (WFST)-based engine. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 63 for intention deduction. In some examples, The ASR module 61 generates multiple candidate text expressions for a speech input. Each candidate text expression is a sequence of words or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may determine the intent of the user and a parameter using a matching rule which is divided into a domain, intent, and a parameter. For example, one domain (e.g., an alarm) may include a plurality of intents (e.g., alarm setting, alarm release, and the like), and one intent may need a plurality of parameters (e.g., a time, the number of iterations, an alarm sound, and the like). The plurality of rules may include, for example, one or more mandatory parameters. The matching rule may be stored in a natural language understanding database.

According to an embodiment, the NLU module 63 may determine a meaning of a word extracted from a user input using a linguistic feature (e.g., a syntactic element) such as a morpheme or a phrase and may match the determined meaning of the word to the domain and intent to determine the intent of the user. For example, the NLU module 63 may determine the intent of the user by calculating how many words extracted from a user input are included in each of the domain and the intent. According to an embodiment, the NLU module 63 may determine a parameter of the user input using a word which is the basis for determining the intent. According to an embodiment, the NLU module 63 may determine the intent of the user using a NLU DB which stores the linguistic feature for determining the intent of the user input. According to another embodiment, the NLU module 63 may determine the intent of the user using a personal language model (PLM). For example, the NLU module 63 may determine the intent of the user using personalized information (e.g., a contact list, a music list, schedule information, social network information, etc.). For example, the PLM may be stored in, for example, the NLU DB. According to an embodiment, the ASR module 61 as well as the NLU module 63 may recognize a voice of the user with reference to the PLM stored in the NLU DB.

According to an embodiment, the NLU module 63 may further include a natural language generating module (not shown). The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63, may change the text input to information in a voice form, and may transmit the information in the voice form to the client device 50. The client device 50 may output the information in the voice form via the speaker.

The speech synthesis module 64 synthesizes speech outputs based on a provided text. For example, a result generated by the ASR module 61 may be in the form of a text string. The speech synthesis module 64 may convert the text string to an audible speech output. The speech synthesis module 64 may use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis.

In some examples, the speech synthesis module 64 may be configured to synthesize individual words based on phonemic strings corresponding to the words. For example, a phonemic string can be associated with a word in a generated text string. The phonemic string can be stored in metadata associated with the word. The speech synthesis model 64 may be configured to directly process the phonemic string in the metadata to synthesize the word in speech form.

Since the cloud environment generally has more processing capabilities or resources than the client device, a higher quality speech output may be acquired in synthesis on the client side. However, the present disclosure is not limited thereto, and the speech synthesis process may be performed on the client side (see FIG. 7).

Meanwhile, according to an embodiment, the client environment may further include an Artificial Intelligence (AI) agent 62. The AI agent 62 is defined to perform at least some of the above-described functions performed by the ASR module 61, the NLU module 62 and/or the TTS module 64. In addition, the AI module 62 may make contribution so that the ASR module 61, the NLU module 62 and/or the TTS module 64 perform independent functions, respectively.

The AI agent module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, speech recognition, natural language processing, speech/signal processing, and the like.

Currently, all commercial speech recognition systems (Microsoft's Cortana, Skype translator, Google Now, Apple Siri, etc.). are based on deep learning techniques.

In particular, the AI agent module 62 may perform various natural language processes, including machine translation, emotion analysis, and information retrieval, to process natural language by use of a deep artificial neural network architecture.

Meanwhile, the cloud environment may include a service manager 65 capable of collecting various personalized information and supporting a function of the AI agent 62. The personalized information acquired through the service manager may include at least one data (a calendar application, a messaging service, usage of a music application, etc.) used through the cloud environment, at least one sensing data (a camera, a microphone, temperature, humidity, a gyro sensor, Cellular VehiCle-to-eVerything (C-V2x), a pulse, ambient light, Iris scan, etc.) collected by the client device 50 and/or the cloud 60, off device data directly not related to the client device 50. For example, the personalized information may include maps, SMS, news, music, stock, weather, Wikipedia information.

For convenience of explanation, the AI agent 62 is represented as an additional block to be distinguishable from the ASR module 61, the NLU module 63, and the TTS module 64, but the AI agent 62 may perform at least some or all of the functions of the respective modules 61, 62, and 64.

In FIG. 6, an example in which the AI agent 62 is implemented in the cloud environment due to computing calculation, storage, power limitations, and the like, but the present disclosure is not limited thereto.

For example, FIG. 7 is identical to what is shown in FIG. 6, except for a case where the AI agent is included in the cloud device.

FIG. 7 is a schematic block diagram of a TTS device in a TTS system environment according to an embodiment of the present disclosure. A client device 70 and a cloud environment 80 shown in FIG. 7 may correspond to the client device 50 and the cloud device 60 aforementioned in FIG. 6, except for some configurations and functions. Accordingly, description about specific functions of corresponding blocks may refer to FIG. 6.

Referring to FIG. 7, the client device 70 may include a pre-processing module 71, a voice activation module 72, an ASR module 73, an AI agent 74, an NLU module 75, and a TTS module 76. In addition, the client device 50 may include an input module (at least one microphone) and at least one output module.

In addition, the cloud environment may include cloud knowledge 80 that stores personalized information in a knowledge form.

A function of each module shown in FIG. 7 may refer to FIG. 6. However, since the ASR module 73, the NLU module 75, and the TTS module 76 are included in the client device 70, communication with Cloud may not be necessary for a speech processing procedure such as speech recognition, speech synthesis, and the like, and thus, an instant real-time speech processing operation is possible.

Each module shown in FIGS. 6 and 7 are merely an example for explaining a speech processing procedure, and modules more or less than in FIGS. 6 and 7 may be included. In addition, two or more modules may be combined or different modules or modules with different arrangement structures may be included. The various modules shown in FIGS. 6 and 7 may be implemented in hardware, software instructions for execution by one or more processors, firmware, including one or more signal processing and/or application specific integrated circuits, or a combination thereof.

Figure 8:
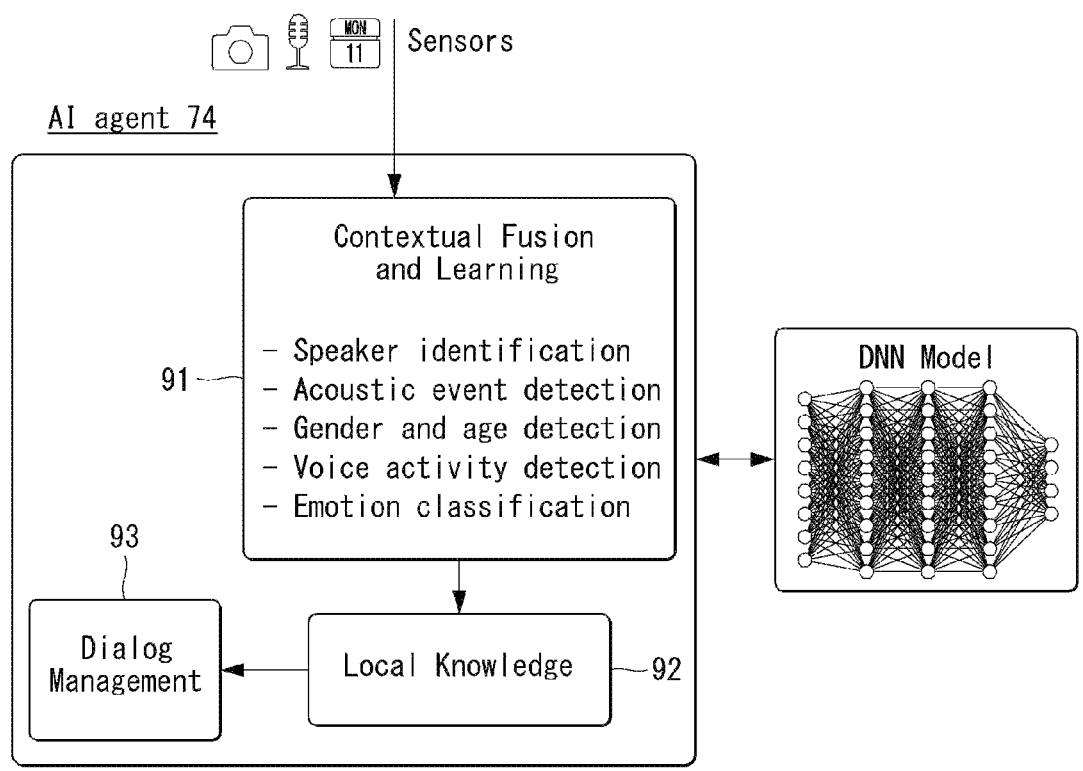
FIG. 8 is a schematic block diagram of an intelligent agent capable of implementing speech information based speech synthesis in accordance with an embodiment of the present disclosure.

FIG. 8 is a schematic block diagram of an AI agent capable of performing emotion classification information-based TTS according to an embodiment of the present disclosure.

Referring to FIG. 8, in the speech processing procedure described with reference to FIGS. 6 and 7, the AI agent 74 may support an interactive operation with a user, in addition to an ASR operation, an NLU operation, and a TTS operation. Alternatively, using context information, the AI agent 74 may make contribution so that the NLU module 63 further clarify, complements, or additionally define information included in text expressions received from the ASR module 61.

Here, the context information may include preference of a user of a client device, hardware and/or software states of the client device, various types of sensor information received before, during, or after a user input, previous interactions (e.g., dialogue) between the AI agent and the user, etc. In the present disclosure, the context information is dynamic and varies depending on time, location, contents of the dialogue, and other elements.

The AI agent 74 may further include a context fusion and learning module 91, a local knowledge 92, and a dialogue management 93.

The context fusion and learning module 91 may learn a user's intent based on at least one data. The at least one data may further include at least one sensing data acquired by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a speech recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI agent 74 may detect presence of a speech from the input audio signal. According to an embodiment the AI agent 74 differentiates a speech data and a non-speech data using a deep neural networks (DNN) model. In addition, the AI agent 74 may perform emotion classification information on the speech data using the DNN model. According to the emotion classification information, the speech data may be classified as anger, boredom, fear, happiness, or sadness.

The context fusion and learning module 91 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be acquired through the above-described DNN model.

The AI agent 74 may include the local knowledge 92. The local knowledge 92 may include user data. The user data may include a user's preference, the user's address, the user's initially set language, the user's contact list, etc. According to an embodiment, the AI agent 74 may additionally define the user's intent by complementing information included in the user's speech input using the user's specific information. For example, in response to the user's request "Invite my friends to my birthday party", the AI agent 74 does not request more clarified information from the user and may utilize the local knowledge 92 to determine who "the friends" are and when and where the "birthday" takes place.

The AI agent 74 may further include the dialogue management 93. The AI agent 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

Figure 9:
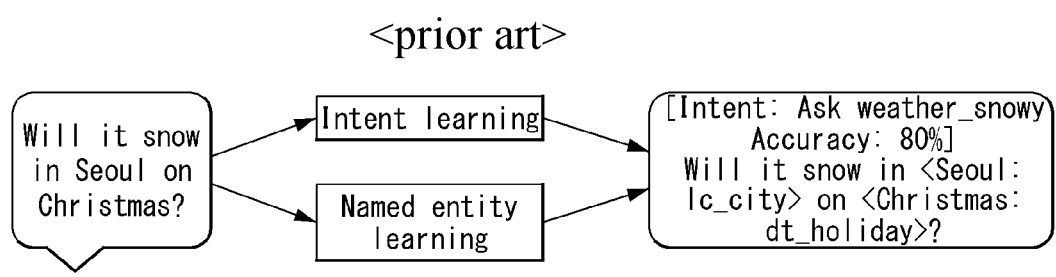
FIG. 9 is a diagram showing a method for analyzing an utterance intent according to the related art.

FIG. 9 is a diagram showing a method for analyzing an utterance intent according to the related art.

Referring to FIG. 9, in the method for analyzing an utterance intent according to the related art, intent learning and named entity learning on a text corresponding to speech uttered by a user may be performed, and learning data may be generated. A processor may analyze the text and analyze the utterance intent of the user based on the learning data. For example, the processor may generate the text "Will it snow in Seoul on Christmas?" which corresponds to speech uttered by a user, "Will it snow in Seoul on Christmas?". After performing intent learning and named entity learning on the text, the processor may perform a named entity recognition step with "Will it snow in <Seoul: lc_city> on <Christmas: dt_holiday>?", and then predict "Ask weather snowy" that is the utterance intent of the user and accuracy of the utterance intent of the user.

In this case, since in "Christmas" there is no expression about the date represented by it, and in "Seoul" there is no expression about city or country which it belongs to, the apparatus for speech recognition has difficulty in analyzing the utterance intent.

Figure 10:
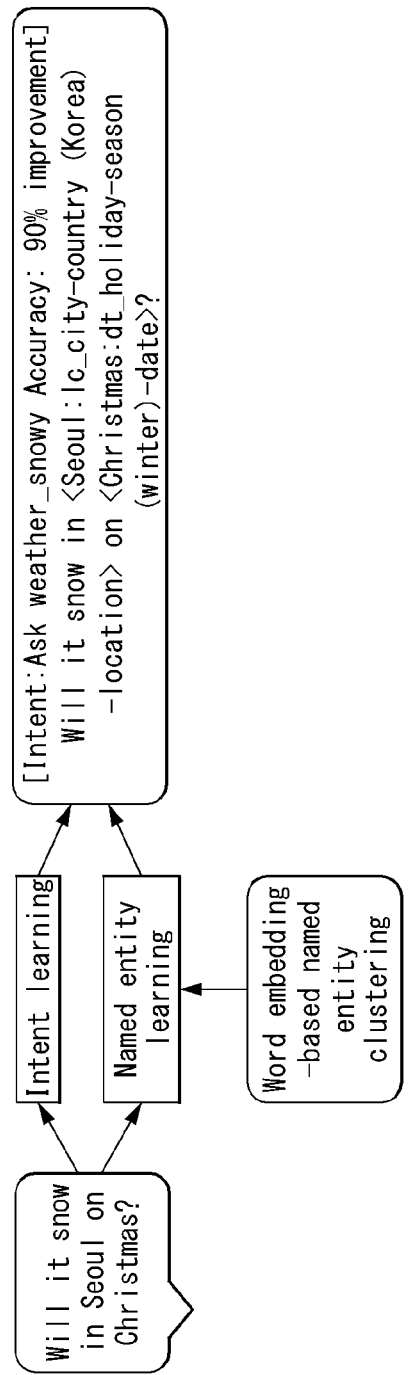
FIG. 10 is a diagram showing a method for analyzing an utterance intent according to an embodiment of the present disclosure.

FIG. 10 is a diagram showing a method for analyzing an utterance intent according to an embodiment of the present disclosure.

Referring to FIG. 10, in a named entity learning step of the method for analyzing an utterance intent according to the embodiment of the present disclosure, named entity clustering based on word embedding may be included. The word embedding may include Word2vec, AdaGram, fastText, and Doc2vec.

The apparatus for speech recognition may recognize speech uttered by the user, and extract the speech uttered by the user to convert the speech into an utterance sentence which is a text. Then, the named entity may be recognized based on the utterance sentence, and relationship information of the named entity may be displayed, in which the named entity is structured by clustering the named entity based on the word embedding method. Then, the named entity and the relationship information of the named entity may be recognized through an analysis unit of the apparatus for speech recognition, and a meaning of the named entity may be clearly grasped in consideration of the relationship information, which makes it possible to analyze the utterance intent of the user more accurately. For example, corresponding to "Will it snow in Seoul on Christmas?" through word embedding-based named entity clustering, "Will it snow in <Seoul: lc_city-country (Korea)-location> on <Christmas: dt_holiday-season (winter)-date>?" may be recognized. When the named entity is recognized as described above, it is possible to more clearly determine the utterance intent of the user by determining that the utterance sentence is "Will it snow in Seoul, Korea, which is a location, on Christmas which is the winter holiday, December 25?"

Figure 11:
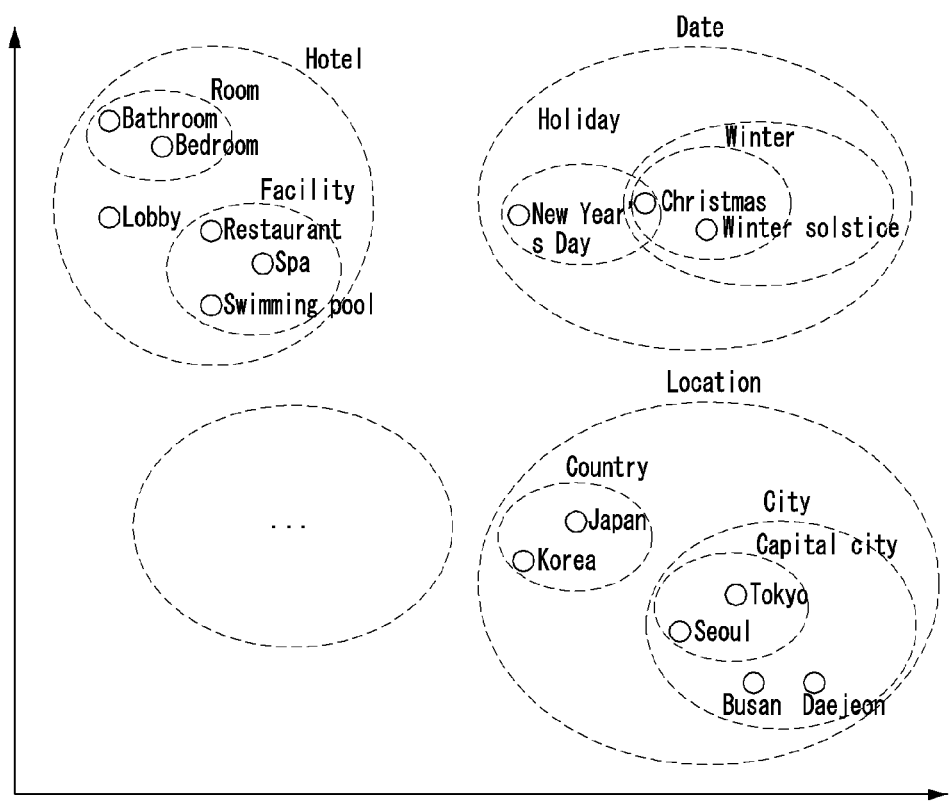
FIG. 11 is a diagram showing a method for structuring a named entity according to the embodiment of the present disclosure.

FIG. 11 is a diagram showing named entity structuring in a vector region according to the embodiment of the present disclosure.

Referring to FIG. 11, a bathroom and a bedroom may be included in a named entity relationship of a room. A restaurant, a spa, a swimming pool, and the like may be included in a named entity relationship of a facility. A lobby, a bathroom, a bedroom, a restaurant, a spa, a swimming pool, and the like may be included in a named entity relationship of a hotel.

In addition, New Year's Day, Christmas, and the like may be included in a named entity relationship of a holiday. Christmas, winter solstice, and the like may be included in a named entity relationship of winter. Christmas, winter solstice, and the like may be included in a named entity relationship of season. New Year's Day, Christmas, winter solstice, and the like may be included in a named entity relationship of a date. As described above, two or more named entities may be included in at least one named entity relationship, and one named entity may not correspond to one named entity relationship, and may correspond to a plurality of named entity relationships.

Korea and Japan may be included in a named entity relationship of a country. Tokyo, Seoul, and the like may be included in a named entity relationship of a capital city. Tokyo, Seoul, Busan, Daejeon, and the like may be included in a named entity relationship of a city. Korea, Japan, Tokyo, Seoul, Busan, Daejeon, and the like may be included in a named entity relationship of a location. In this case, Seoul and Korea belong to the named entity relationship of the capital city and the named entity relationship of the country, respectively, and Seoul and Korea are named entities included in named entity relationships different to each other, but from a broader perspective, they are named entities included in the named entity relationship of the location. Furthermore, "Seoul" is not included in the named entity relationship of the country, but "Seoul" and "Korea" are closely related named entities. In the case of the named entities that are semantically closely related to each other, it is possible to easily grasp the meaning of the named entity by including the named entity relationship in the named entity, although "Seoul" and "Korea" are not included in the same named entity relationship. For example, in recognizing the named entity of "Seoul", the named entity may be represented as <Seoul: lc_city-location>, or may be represented as <Seoul: lc_city-country-location>. In view of the named entity relationship, Seoul is not included in the named entity relationship of the country, but the named entity relationship information may be considered based on the similarity of the word vectors.

Figure 12:
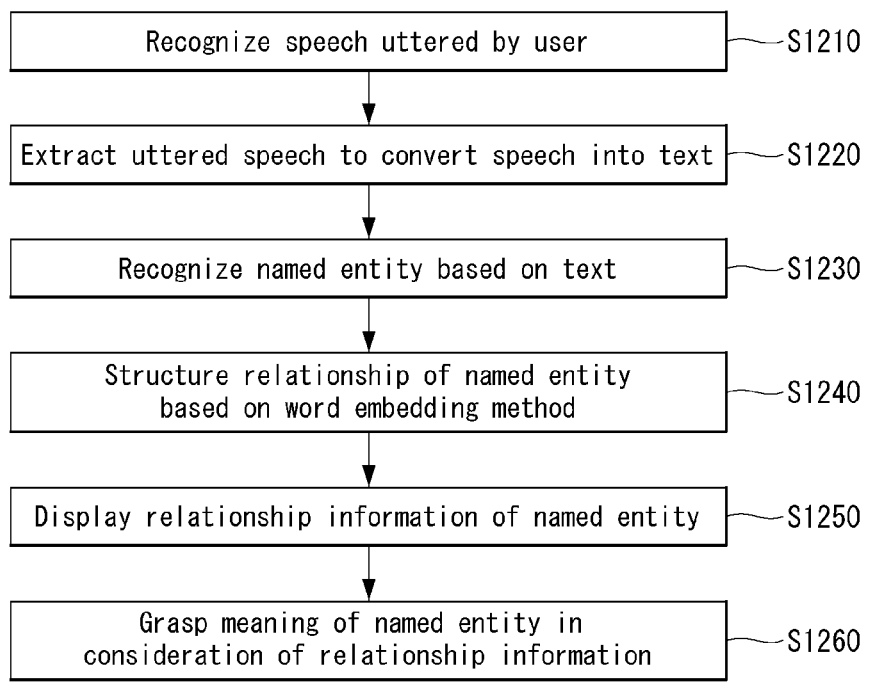
FIG. 12 is a flowchart showing a method for determining a meaning of the named entity according to the embodiment of the present disclosure.

FIG. 12 is a flowchart showing a method for determining a meaning of the named entity according to the embodiment of the present disclosure.

Referring to FIG. 12, the present disclosure may recognize speech uttered by a user (S1210), and extract the uttered speech to convert the speech into a text (S1220). Then, a named entity may be recognized based on the text (S1230). In the named entity recognition, in addition to determining an utterance intent of the user only based on named entity recognition, a named entity relationship may be considered, which is made possible by structuring the named entity relationship through named entity clustering based on the word embedding method (S1240) and displaying relationship information of the named entity together (S1250). Through the named entity learning considering the named entity relationship, the meaning of the named entity may be clearly grasped, and the utterance intent of the user may also be clearly grasped (S1260).

In addition, in the case of the word embedding-based named entity clustering method, unlike the corpus-based named entity learning, a similarity between features may be measured through weight calculation between the features according to an unsupervised learning method, and the named entity with a high similarity for a threshold may clustered. Moreover, in the case of the word embedding-based named entity clustering method, since a label for data is not necessary unlike a supervised learning method performed in a state in which the label is given, separate training is not required for the similar text. Accordingly, an utterance intent analysis may be made easy.

Figure 13:
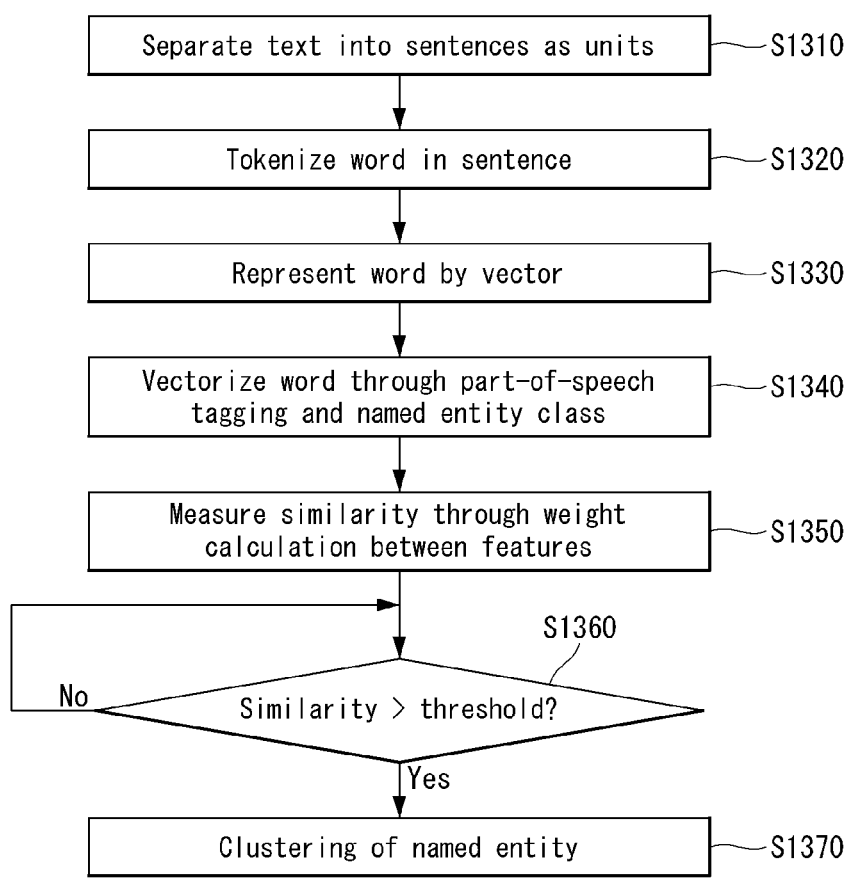
FIG. 13 is a flowchart showing a method for clustering the named entity according to the embodiment of the present disclosure.

FIG. 13 is a flowchart showing a method for clustering the named entity according to the embodiment of the present disclosure.

Referring to FIG. 13, the structuring of the named entity relationship based on the word embedding method according to the present disclosure may include separating the text into sentences as units (S1310) and identifying (tokenizing) each word in the sentence (S1320), and representing the word by a vector and vectorizing the word through part-of-speech tagging and a named entity class (S1330, S1340). Subsequently, a similarity between features may be measured through weight calculation between the features (S1350), and when the similarity is greater than or equal to a preset threshold (S1360), the named entity may be structured by clustering the named entity (S1370).

Specifically, word embedding is a representative method representing a word by a vector and mainly means conversion from sparse representation to dense representation. For example, in the One-Hot-Vector generated through One-Hot-Encoding, an index value of a word to be represented is 1, and the remaining index value may be represented by 0. In this way, a method of representing most of the values of a vector or a matrix by 0 may be referred to as sparse representation.

On the other hand, dense representation may have real values other than 0 and 1, and may densify the dimensions of the vector. Word embedding represents a word in the form of a dense vector, and a vector generated through a word embedding method may be represented by an embedding vector. Examples of the embedding method may include word2vec, FastText, Glove, and the like.

Figure 14:
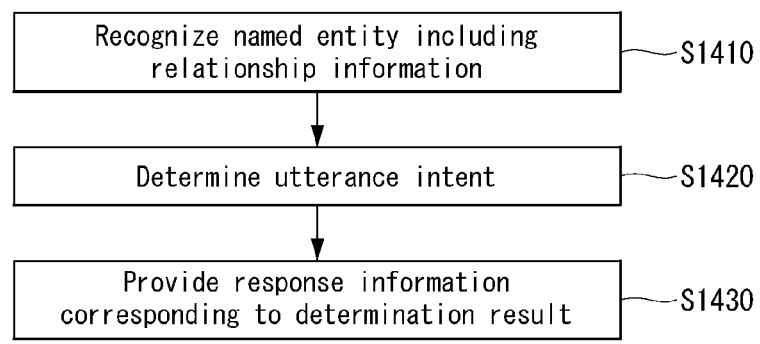
FIG. 14 is a flowchart showing a method for speech recognition according to the embodiment of the present disclosure as a whole.

FIG. 14 is a flowchart showing a method for speech recognition according to the embodiment of the present disclosure as a whole.

In the related art, the utterance intent is grasped only based on the named entity recognition. However, according to the embodiment of the present disclosure, as described in FIGS. 11 and 12, the named entity recognition including the relationship information may be performed (S1410), and the meaning of the named entity may be clearly grasped by recognizing the named entity of the word and the relationship information together (S1420). For example, "Christmas" may be represented as "<Christmas: dt_holiday-season-date>", and season and date represent the named entity relationship, and may be recognized together with dt_holiday which is the original named entity in the named entity learning step.

Then, through the named entity recognition considering the named entity relationship, the apparatus for speech recognition may determine the utterance intent, and may provide response information in response to the determination result of the utterance intent (S1430). In some embodiments, the utterance intent may be determined, expected accuracy between the determination result and the actual utterance intent may be measured, and the measured expected accuracy may be output through a display unit or an audio output unit of the apparatus for speech recognition. For example, in the case of the utterance sentence of which the named entity recognition is finished by "Will it snow in <Seoul: lc_city-country—location> on <Christmas_dt_holiday-season-date>?", compared with the utterance intent of the user, "Ask_weather_snowy", the accuracy is approximately 90%, and the apparatus for speech recognition may output the determination result as "It will be snowing in Seoul on Christmas, and the accuracy of the utterance intent is 90%." For example, according to the accuracy of the determination result of the utterance intent, corresponding output information may be set. In this case, when the accuracy of the determination result is 90% or more, the information may be displayed to the user by emitting a green LED, and when the accuracy is 80% to 90%, the information may be displayed to the user by emitting an orange LED. In this way, the accuracy of the determination result may be guided to the user by using a display device.

In some embodiments, at the time of the determining of the utterance intent is performed, when the utterance intent is determined and the accuracy of the utterance intent is small compared to a preset target value, that is, accuracy of the target determination result, the relationship information of the named entity may need to be reset. In this case, in order to reset the relationship information, restructuring the named entity relationship is included. In the restructuring, a threshold of the similarity is set to be smaller than a threshold in the structuring previously performed and then the feature of the named entity is extracted. Therefore, minimum relationship information may be derived and the meaning of the named entity may be easily grasped.

In some embodiments, when at least one utterance sentence is input while the response information is being provided, the response information may be updated based on an additional utterance sentence input later. For example, the user may modify the uttered contents using the apparatus for speech recognition. In this case, the user may input a new utterance sentence different from the previously uttered contents into the apparatus for speech recognition, and may update the response information based on the additional utterance sentence input later.

In addition, in some embodiments, it may be recognized that a plurality of utterance intents is present as a result of the utterance intent determination. For example, when the user utters "Airstar, raise the speaker", it may be recognized as meaning to raise the position of the speaker or to increase the volume of the speaker. In this case, the apparatus for speech recognition may provide the response information corresponding to the utterance intent with a high reliability among the plurality of utterance intents.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for processing speech of an apparatus for speech recognition, the method comprising:
   recognizing speech uttered by a user;
   extracting the speech uttered by the user to convert the speech into a text;
   recognizing a named entity based on the text;
   structuring a relationship of the named entity based on a word embedding method by:
   performing tokenization by separating the text into sentences as units and then identifying each word in a sentence among the sentences; and
   performing embedding by representing the identified word by a vector and vectorizing the word through part-of-speech tagging and a named entity class, wherein a similarity between features is measured through weight calculation between the features according to an unsupervised learning method, and the named entity with a high similarity for a threshold is clustered;
   determining an utterance intent based on the text corresponding to the speech of the user by:
   recognizing the named entity,
   recognizing a relationship information of the structured named entity, and
   restructuring the relationship of the named entity to reset the relationship information, when accuracy of the utterance intent is small compared to a preset target value, wherein a threshold in the restructuring of the relationship of the named entity is smaller than a threshold in the structuring of the relationship of the named entity previously performed;
   providing response information corresponding to a determination result of the utterance intent;
   displaying the relationship information of the structured named entity; and
   determining a meaning of the named entity in consideration of the relationship information.

2. The method of claim 1,
   wherein the word embedding method uses at least one of Word2vec, AdaGram, FasText, or Doc2vec.

3. The method of claim 1, further comprising:
   displaying a response corresponding to the utterance intent together with accuracy of the utterance intent.

4. The method of claim 1, further comprising:
   updating the response information based on an additional text uttered after the text has been input, when the texts are input while the response information is being provided.

5. The method of claim 1,
   wherein, when a plurality of intents is determined as the result of the determining of the utterance intent, the response information corresponding to the utterance intent with a high reliability is provided among the plurality of intents.

6. An apparatus for speech recognition, the apparatus comprising:
   a microphone;
   a memory; and
   a processor,
   wherein the microphone recognizes speech uttered by a user, and
   wherein the processor is configured to:
   extract the speech uttered by the user to convert the speech into a text;
   recognize a named entity based on the text;
   structure a relationship of the named entity based on a word embedding method by:
   performing tokenization by separating the text into sentences as units and then identifying each word in a sentence among the sentences; and
   performing embedding by representing the identified word by a vector and vectorizing the word through part-of-speech tagging and a named entity class, wherein a similarity between features is measured through weight calculation between the features according to an unsupervised learning method, and the named entity with a high similarity for a threshold is clustered;
   determine an utterance intent based on the text corresponding to the speech of the user by:
   recognizing the named entity,
   recognizing a relationship information of the structured named entity, and
   restructuring a relationship of the named entity to reset the relationship information, when accuracy of the utterance intent is small compared to a preset target value, wherein a threshold in the restructuring of the relationship of the named entity is smaller than a threshold in the structuring of the relationship of the named entity previously performed;
   provide response information corresponding to a determination result of the utterance intent;
   display the relationship information of the structured named entity;

determine a meaning of the named entity in consideration of the relationship information.

7. The apparatus of claim 6, wherein the word embedding method uses at least one of Word2vec, AdaGram, FasText, or Doc2vec.

8. The apparatus of claim 6, further comprising:
a display unit,
wherein the display unit displays a response corresponding to the determined utterance intent together with accuracy of the utterance intent.

9. The apparatus of claim 6, wherein the processor is configured to update the response information based on an additional regarding utterance after the text has been input when the one or more of the texts are input while the response information is being provided.

10. The apparatus of claim 6, wherein the processor is configured to provide the response information corresponding to the utterance intent with a high reliability among a plurality of intents, when the plurality of intents is determined as the result of the determining of the utterance intent.

* * * * *